Patented Nov. 29, 1938

2,138,226

UNITED STATES PATENT OFFICE

2,138,226

AQUEOUS DISPERSION OF POLYMERIZED HALOGEN-2-BUTADIENES-1,3 AND PROCESS OF PREPARING SAME

Benton Dales, Chadds Ford, Pa., and Frederick Baxter Downing, Carneys Point, N. J., assignors to E. I. du Pont de Nemours & Company, Wilmington, Del., a corporation of Delaware No Drawing. Application March 2, 1937, Serial No. 128,630

24 Claims. (Cl. 134—26)

This invention relates to the preparation of dispersions, or latices, of polymerized halogen-2-butadienes-1,3. More particularly it relates to the preparation of latices of these substances of any desirable concentration up to 60% or more in which the dispersed particles carry positive electrical charges. Such latices are, hereinafter, in both the specification and claims, called positively charged latices. Chloro-2-butadiene-1,3 and bromo-2-butadiene-1,3 will be called respectively chloroprene and bromoprene.

Dispersions of the monomer of halogen-2-butadiene-1,3 in which the electrical charges on the particles are negative and in which the dispersed monomer will polymerize under controlled conditions have been described in Collins U. S. Patent No. 1,967,861. The halogen-2-butadiene-1,3 content of these dispersions may be 55 or 60% or more. Since halogen acid is liberated during polymerization the aqueous medium in these latices may become acid to litmus (pH less than 7) and a part of the polymerization may, therefore, take place in an acid medium. But the electrical charges on the dispersed particles remain negative and the latices are in general coagulated by added acid.

It has also been disclosed in a copending application of J. E. Kirby, Serial No. 96,051, filed August 14, 1936, that positively charged latices may be made from some of the negatively charged latices by the addition of a suitable protective colloid, as gelatine, and then of acid to the diluted latex. In the same application Kirby has disclosed further that a positively charged latex may be made by dispersing chloroprene monomer in a solution of casein in 30% acetic acid and allowing the monomer to polymerize. Neither these methods nor any others known prior to the application Serial No. 741,044, filed August 23, 1934, of which this application is a continuation-in-part, have ever been successfully employed to prepare stable dispersions of polymers of halogen-2-butadienes-1,3 in which the particles carry a positive charge except in concentrations below 25% by weight and so far as applicant is aware no method known prior to him can be used to produce such positively charged latices in concentration above about 25%. This method, therefore, constitutes a distinct improvement in the art of making such latices. By the term "stable dispersion" as used above and hereinafter is meant a dispersion which does not show appreciable coagulation under ordinary conditions of storage and shipping and is thus suitable for commercial use and as contrasted with an "unstable dispersion" which shows appreciable coagulation under ordinary conditions of storage and shipping and thus is not suitable for commercial use.

It is an object of the present invention to prepare aqueous dispersions of halogen-2-butadienes-1,3 in which the particles bear positive electric charges. It is a further object of the invention to polymerize the dispersed halogen-2-butadienes-1,3. It is a further object to prepare dispersions of halogen-2-butadiene-1,3 polymers in novel dispersion media. It is a still further object to prepare and polymerize such dispersions of chloroprene or bromoprene. Another object is to prepare dispersions containing halogen-2-butadiene-1,3 polymers in which the particles bear positive electric charges and in which the polymer is present in high concentration, i. e. above about 25% by weight and preferably from about 40% to 50%, by weight. It is a still further object to preserve and compound such dispersions. Another objective is to make possible the formation of films, thin sheets and other masses of halogen-2-butadiene-1,3 polymers, particularly chloroprene polymers, having less color and other properties different from similar products made from a negatively charged particle latex. Other objects will appear hereinafter.

Substances acquire an electrical charge on their particles as they become finely dispersed. This charge is usually negative as in such natural dispersions as milk and rubber latex. Among the relatively few substances that have a definite tendency to acquire a positive particle charge on dispersion are the oxides and hydroxides of iron and aluminum and some metals of higher valence and Prussian blue. Other substances, such as chloro-2-butadiene-1,3 polymer, when dispersed may carry on their particles either a positive or a negative charge depending upon the conditions. The principal determining condition is probably the nature of the dispersing agent.

Latices have been commonly called "acid" or "alkaline" on the assumption that the ones whose aqueous dispersion media were on the acid side of neutrality contained only positively charged particles while those with media on the alkaline side contained negatively charged particles. This is of course true in some cases, but it is not true generally enough to justify the assumption. The point is illustrated in the following table showing the sign of the charge on the particles in a number of latices.

| Dispersing agent | Latex particle charge | Reaction of dispersion medium to litmus | Particle charge after addition of NaOH to alkalinity | Particle charge after addition of NH₄OH to alkalinity |
|---|---|---|---|---|
| Sod. abietene sulfonate | − | Acid | − | − |
| Sod. isopropyl naphthalene sulfonate | − | Acid | − | − |
| Sod. higher alkyl sulfate | − | Acid | − | − |
| Sulfated sodium oleyl acetate | − | Acid | − | − |
| Saponine | − | Acid | − | − |
| Cetyl trimethyl-ammonium bromide | + | Acid | + | + |
| Stearylamine hydrochloride | + | Acid | − | − |
| C-hexadecyl betaine | + | Acid | − | + |
| N-lauryl betaine | + | Acid | − | + |

This determination is very simply made by observing under the microscope the direction of the movement of particles or of particle groups in a drop of diluted latex, the slide used being equipped with metal foil electrodes connected with a source of electric current. Each latex was also tested with litmus paper. It is evident that the latices made with dispersing agents which are alkali salts of organic acids all have negatively charged particles, though the dispersion media in all of these that were tested were acid to litmus. Soaps and alkali salts of alcohol sulfates (known to the trade as "Gardinols" or "Duponols") give latices which are usually kept alkaline to litmus, but they may also become acid to litmus without breaking. The dispersing agents which yield latices with positively charged particles appear to be of three types in regard to reversibility of charge:

1. The charge on the particle may not be reversed with fixed alkali or with ammonia. The example is cetyl trimethylammonium bromide.

2. The charge may be reversed with either fixed alkali or ammonia. The example given is stearylamine hydrochloride.

3. The charge may be reversed with fixed alkali but not with ammonia. The examples given are C-cetyl and N-lauryl betaine.

The objects of this invention are accomplished by adding cold chloroprene monomer, for example, preferably in a continuous relatively small stream, to a cold aqueous solution of dispersing agent which is maintained in vigorous agitation. There results a dispersion of the monomer which is allowed to stand in any equipment in which the temperature may be kept at approximately 18–20° C. With proper control, such as suitable agitation and cooling means, it is possible to cause the polymerization to proceed steadily without excessive temperature rise through any desired period of time. The most desirable temperature for the polymerization process has been found to be about 18° for the monomer will polymerize practically completely at that temperature in 24 hours and the polymer will have optimum physical properties. The dispersing agents best adapted to making positively charged chloroprene or bromoprene latex have been found to be cetyl and stearyl trimethyl ammonium bromides and C- or N-cetyl and stearyl betaines.

The resulting latex is milk white in color and the polymer does not settle out. The particles of polymer are very small and move toward the cathode if an electric current is applied. Coagulation of the latex may be brought about in various ways, such as, by evaporation or by freezing.

Hydrogen halide may be formed during the polymerization of halogen-2-butadiene-1,3 and on subsequent standing. This will generally cause coagulation in a negative particled latex which is not specially treated to neutralize the acid. The hydrogen halide formed in the latices of this application does not produce coagulation.

The halogen-2-butadiene-1,3 polymers undergo a slow oxidation. It is desirable to prevent this as much as possible. This is accomplished by the addition of a suitable anti-oxidant. Polyhydroxy phenols and their ethers have been found efficient for this purpose. Catechol itself may be dissolved directly in the latex. The preferred anti-oxidant is eugenol, which is added as aqueous emulsion made with the dispersing agent used in the latex itself. Eugenol and its oxidation products have very little color in mixtures which contain acid. Consequently films of halogen-2-butadiene-1,3 polymer obtained from latices containing this antioxidant will have relatively little color. Two per cent of antioxidant, based upon the amount of halogen butadiene present, is ordinarily sufficient. Preferably not more than 1.5% will be used.

The following examples give only preferred proportions. The proportions may be varied widely as desired without departing from the spirit of the invention and it is not intended to limit the invention to these proportions or in any way except as indicated by the appended claims. All parts indicated in the examples are by weight.

Example 1

One hundred parts of chloroprene monomer are added to a solution of 3 parts of cetyl trimethyl ammonium bromide in 100 parts of water with continuous vigorous agitation. The chloroprene is added in a relatively small stream, or at least one small portion first and the rest in two or three portions. The emulsified chloroprene is then allowed to polymerize under the conditions outlined above. The polymerized chloroprene latex is then treated with 1.5 parts of eugenol in the form of 33% emulsion in water containing 10% of the cetyl trimethyl ammonium bromide.

Example 2

Lauryl trimethyl ammonium chloride is substituted for the cetyl trimethyl ammonium bromide in the above example. Otherwise the procedure and the proportions are the same.

Example 3

One hundred parts of chloroprene monomer are added as in Ex. 1 to a solution of 1.5 parts of cetyl pyridinium bromide in 100 parts of water. The rest is as in Ex. 1 except that the eugenol is preferably emulsified at same concentration in cetyl pyridinium bromide solution.

Example 4

Stearyl pyridinium bromide is substituted for cetyl pyridinium bromide in the above example. Otherwise the procedure and the proportions are the same.

Example 5

One hundred parts of chloroprene monomer are added to a solution of two parts of the hydrochloride of diethyl ethylene oleyl diamide in 100 parts of water as in Ex. 1. The rest is as in Ex. 1 except that the eugenol is preferably emulfied at the same concentration in a solution of the emulsifying agent of this example.

Example 6

Stearyl amine hydrochloride is substituted for the hydrochloride of diethyl ethylene oleyl diamide in the above example. Otherwise the procedure and proportions are the same. Polymerization proceeds steadily but more slowly than in the examples already given.

Example 7

One hundred parts of chloroprene monomer are added to a solution of two parts of C-hexadecyl betaine in 100 parts of water as in Ex. 1. The rest is as in Ex. 1 except that the eugenol is preferably emulsified at the same concentration in a solution of the emulsifying agent of this example. Polymerization proceeds a little more slowly than in Ex. 1 to 5, more rapidly than in Ex. 6. There is more tendency for the emulsion to separate, but this can be overcome by more frequent shaking or stirring until polymerization has become well started.

Example 8

N-lauryl betaine is substituted for C-hexadecyl betaine in the above example. Otherwise, the procedure and proportions are the same.

While the above invention has been particularly described with reference to chloroprene, it will be understood that it is not to be so limited. The invention in its broad aspect includes all of the halogen-2-butadienes-1,3-. Very good results have been obtained with bromoprene as well as with the chloro-derivative.

Latices containing up to about 60% of halogen-2-butadiene-1,3 polymer may be prepared in the manner described in this application. For most purposes, however, latices containing from 40 to 50% of polymer give the best results. Latices containing above about 25% of polymer also constitute a preferred group and as pointed out above, prior to the present invention it was not possible to prepare dispersions of chloroprene in these concentrations, in which the particles bore positive electric charges.

It has been noted above that it is probably the nature of the dispersing agent which is the principal factor in determining what charge the emulsified particles of polymer will bear. It has been found, however, that many different types of dispersing agents are useful in the present invention to produce dispersions of chloroprene polymer in which the particles bear a positive charge, particularly when the aqueous medium in which they are dispersed has an acidity greater than pH 7. Thus, many salts of organic bases have been found to give good results. These salts are both "simple" and "complex". By "simple salts" are meant salts of organic bases which contain the nucleus

in which Y is an acid radical, i. e., one which results upon removing an acid hydrogen atom from an acid. By "complex salts" are meant those in which the linkage of the acid and basic radicals is more complex than the direct linkage of the simple salts, i. e., for example, salts of organic bases which in aqueous solution are believed to be, in part, condensed to compounds which contain the nucleus

in which the COO acid group is doubly linked to the basic group although they may exist in part in the form

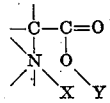

in which Y is hydrogen or base metal and X is hydroxyl, halogen, or other anion.

Simple salts suitable for use as emulsifying agents in the process of this invention include salts of organic bases of high molecular weight with inorganic acids. The term "organic base" as used herein is intended to include only those organic bases which have a definitely basic character. Substances somewhat loosely termed "bases" but which are really both acidic and basic in character, i. e., amphoteric, are not intended to be included. The "salts" may be such as are formed by reacting amines with inorganic acids or such as are formed by reacting amines with esters of inorganic acids, as is, hereinafter more fully pointed out. Suitable complex salts include salts of the betaine type which contain at least one long chain alkyl radical. They may be salts of organic bases with either organic acids or oxygen-containing inorganic acids.

The preferred emulsifying agents fall into three classes.

1. Quaternary ammonium salts in which at least one valence of the nitrogen in the base is satisfied by an alkyl group containing at least 6 carbon atoms. The nitrogen may be a part of a heterocyclic nucleus. Such salts are obtainable by reacting an alkyl halide or mixture of alkyl halides containing more than 5 carbon atoms with a tertiary amine, in which the nitrogen may be a part of a heterocyclic ring or may have three separate hydrocarbon groups attached to it. The quaternary ammonium salts need not necessarily be halogen acid salts, however. The halogen may be replaced by another inorganic acid radical. Any of these compounds, or a mixture, naturally occurring or otherwise may be used as the emulsifying agent in the process of the present invention. Their use is illustrated in Examples 1, 2, and 3. The preparation and properties of the salts containing a heterocyclic ring is described in an application of Baldwin and Hailwood, Serial No. 611,236, filed May 13, 1932, and also in a British patent of the same inventors, No. 379,376.

2. Hydrochlorides of a group of organic bases of the general formula:

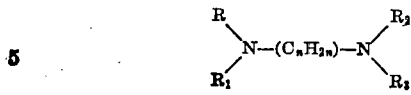

wherein R means an acyl radical containing more than 5 carbon atoms, $R_1$ means H or an acyl radical, $R_2$ and $R_3$ mean H or a hydrocarbon radical, such as alkyl, aryl, and $n$ means a whole number greater than 1. The preparation of these compounds is described in U. S. Letters Patent No. 1,534,525. The best results have thus far been obtained with the compounds of this type in which $n=2$, and R is a higher molecular weight radical. A particularly good compound of this type is the one used in Example 5. Other salts of organic bases which may be used include the hydrochloride of stearlyamine (see Example 6) and the phosphate of lauryl methyl glucamine.

3. Quaternary ammonium salts of the type which exist in aqueous solution in one or both of the forms represented by the following general formula

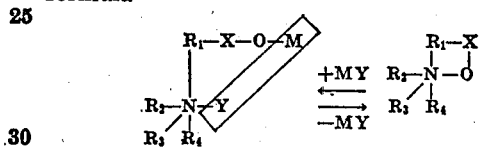

in which M is hydrogen or a base metal, preferably an alkali metal, such as sodium or potassium, Y is hydroxyl, halogen, or other anion, preferably chlorine or bromine, and $R_1$, $R_2$, $R_3$, and $R_4$ are alkyl radicals, one of which contains more than 5 carbon atoms and the other three of which contain less than 8 carbon atoms and in which compound N is separated from X by less than 5 carbon atoms, preferably 1 and the group —X—O— is an acidic salt forming group which is free of acid hydrogens, such as COO, $SO_3$ and the like. The preparation and properties of these compounds are described in a co-pending application of Downing and Johnson, Serial No. 13,664, filed March 29, 1935. Those in which the long chain alkyl radical is attached to carbon may be made by the interaction of tertiary aliphatic amines and the proper higher halogen alkyl fatty acids. The C-hexadecyl betaine of Example 7 is such a compound. Those in which the higher alkyl radical is attached to nitrogen may be made, for example, by the interaction of dimethyl glycine and suitable alkyl halides or by the action of tertiary aliphatic amines containing a long chain alkyl group upon monohalogen acetic acid.

While all of the above emulsifying agents yield chloroprene polymer latices with positively charged particles, they behave differently with regard to reversal of this charge by alkalis. See table on page 5. With emulsifying agents of the second class above either sodium hydroxide or ammonia causes a reversal of the particle charge from positive to negative. With quaternary ammonium salts (first class) the particle charge is not reversed by either alkali, while with the complex quaternary ammonium salts (third class) as emulsifying agents the particle charge is reversed by sodium hydroxide but not by ammonia.

The amounts of these dispersing agents to be used may vary considerably from the preferred amounts given in the examples and still give satisfactory results. From 1 to 4% of emulsifying agent based on halogen butadiene will give satisfactory results. Lesser amounts tend to decrease the stability of the latex and greater amounts tend to alter the physical properties of the polymer especially when this is obtained by evaporation. Preferably not less than 1.5% nor more than 3% of emulsifying agent, on the same basis will be used.

Of the above emulsifying agents those containing substituents having from 12 to 18 carbon atoms are the most efficient. Those whose substituents contain as few as 6 carbon atoms may be used but better results are obtained if at least a portion of the emulsifying agent used contains the heavier substituent. Frequently a mixture of compounds will be employed containing substituents ranging from 8 to 18 carbon atoms.

It has been stated above that it is preferable to add the cold monomer to a cold aqueous solution of the dispersing agent but though it is preferable it is not essential. The constituents of the dispersions may be brought together in other ways and under conditions varying considerably from those found preferable. Agitation and cooling during polymerization are also preferable but not essential and other controls are contemplated. Polymerization temperatures varying both above and below 18° C., which is preferred, may be employed without going beyond the scope of the present invention. Furthermore, the time of polymerization may vary widely and though in the above description of the invention, polymerization is carried to completion, this feature also is not essential to the invention. The polymerization may be stopped at any point short of complete polymerization where it is desired to do so.

These latices may be mixed with suitable aqueous dispersions of filling, softening, and thickening agents. These dispersions must contain particles positively charged if they are to be added to the unaltered positively charged latices of this specification. The dispersing agents must be of the same character as those used in making the latices, namely salts of inorganic acids with organic bases of high molecular weight or complex quaternary ammonium salts, or they may consist of some proteins as casein in acid solution or gelatine. Materials which may be dispersed in such manner that they may be added to these latices without appreciable coagulation are oleyl alcohol, rosin, cottonseed oil, aluminum hydroxide, beryllium hydroxide. Natural and synthetic rubber latices may be converted into positively charged dispersions and then be added, rubber acting as a quite satisfactory softener for the chloroprene polymer.

Gelatin and starches produce a trickening of these latices. The thickened latices especially those obtained with gelatine, wet glass and other smooth surfaces better than the unthickened ones. Saponine added causes these latices to wet such surfaces better than if not used and produces no appreciable thickening.

It is evident from the above description that a new class of dispersions may be prepared readily by the process of this invention. The use of the emulsifying agents described herein makes possible the preparation of valuable positively charged halogen-2-butadiene-1,3 latices and ones having much higher concentration than has been known before. Among their more obvious important uses are:

In dipping processes, in alternation with negatively charged rubber or chloroprene polymer latices to produce by mutual coagulation, thicker layers of chloroprene polymer or of rubber and chloroprene polymer than those obtainable with either negatively or positively charged latices alone.

The formation of films or of spread coatings on surfaces of opposite electrical charge with practically no penetration. Other advantages and improvements are apparent from the description.

Many widely different embodiments of this invention may be made without departing from the spirit and scope thereof and, therefore, it is not intended to be limited except as indicated in the appended claims.

We claim:

1. An aqueous dispersion of a halogen-2-butadiene-1,3 containing as an emulsifying agent a salt of an organic base selected from the group consisting of simple salts of inorganic acids and organic bases of high molecular weight and complex quaternary ammonium salts which in aqueous solution contain the following nucleus

in which $R_1$ is an alkylene group and $R_2$, $R_3$ and $R_4$ are alkyl groups, one of which four groups represented by an R contains more than 5 carbon atoms and the other three of which contain less than eight carbon atoms, in which N is separated from X by less than 5 carbon atoms and in which X—O— is an acidic salt forming group, the free valences of the nitrogen and of the oxygen in the nucleus being satisfied in the salts by each other or by the ions of a neutral salt.

2. An aqueous dispersion of a halogen-2-butadiene-1,3 polymer containing as a dispersing agent a salt of an organic base selected from the group consisting of simple salts of inorganic acids and organic bases of high molecular weight and complex quaternary ammonium salts which in aqueous solution contain the following nucleus

in which $R_1$ is an alkylene group and $R_2$, $R_3$ and $R_4$ are alkyl groups, one of which four groups represented by an R contains more than 5 carbon atoms and the other three of which contain less than eight carbon atoms, in which N is separated from X by less than 5 carbon atoms and in which X—O— is an acidic salt forming group, the free valences of the nitrogen and of the oxygen in the nucleus being satisfied in the salts by each other or by the ions of a neutral salt.

3. An aqueous dispersion of chloro-2-butadiene-1,3 containing as an emulsifying agent a salt of an organic base selected from the group consisting of simple salts of inorganic acids and organic bases of high molecular weight and complex quaternary ammonium salts which in aqueous solution contain the following nucleus

in which $R_1$ is an alkylene group and $R_2$, $R_3$ and $R_4$ are alkyl groups, one of which four groups represented by an R contains more than 5 carbon atoms and the other three of which contain less than eight carbon atoms, in which N is separated from X by less than 5 carbon atoms and in which X—O is an acidic salt forming group, the free valences of the nitrogen and of the oxygen in the nucleus being satisfied in the salts by each other or by the ions of a neutral salt.

4. An aqueous dispersion of chloro-2-butadiene-1,3 polymer containing as a dispersing agent a salt of an organic base selected from the group consisting of simple salts of inorganic acids and organic bases of high molecular weight and complex quaternary ammonium salts which in aqueous solution contain the following nucleus

in which $R_1$ is an alkylene group and $R_2$, $R_3$ and $R_4$ are alkyl groups, one of which four groups represented by an R contains more than 5 carbon atoms and the other three of which contain less than eight carbon atoms, in which N is separated from X by less than 5 carbon atoms and in which X—O— is an acidic salt forming group, the free valences of the nitrogen and of the oxygen in the nucleus being satisfied in the salts by each other or by the ions of a neutral salt.

5. An acid aqueous dispersion of halogen-2-butadiene-1,3 polymer containing as a dispersing agent a salt of an inorganic acid and an organic base of high molecular weight.

6. An acid aqueous dispersion of chloro-2-butadiene-1,3 polymer containing as a dispersing agent a salt of an inorganic acid and an organic base of high molecular weight.

7. An acid aqueous dispersion of chloro-2-butadiene-1,3 polymer containing as a dispersing agent a quaternary ammonium salt of the general formula

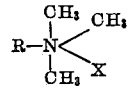

in which R is a straight chain primary saturated hydrocarbon radical containing from 12 to 18 carbon atoms and X is a halogen.

8. An acid aqueous dispersion comprising in a dispersed phase rubber and chloro-2-butadiene-1,3 polymer and containing as a dispersing agent a salt of an inorganic acid and an organic base of high molecular weight.

9. The process which comprises dispersing a halogen-2-butadiene-1,3 in water in the presence of a salt of an inorganic acid and an organic base of high molecular weight and thereafter polymerizing the dispersed halogen-2-butadiene-1,3.

10. The process which comprises dispersing chloro-2-butadiene-1,3 in water in the presence of a salt of an inorganic acid and an organic base of high molecular weight and thereafter polymerizing the dispersed chloro-2-butadiene-1,3.

11. The process which comprises dispersing chloro-2-butadiene-1,3 in water in the presence of a salt of an inorganic acid and an organic base of high molecular weight and thereafter polymerizing the dispersed chloro-2-butadiene-1,3 at about 18 to 20° C. with stirring.

12. A process which comprises dispersing chloro-2-butadiene-1,3 in water in the presence of about 1½% to about 3% of the hydrochloride of a diethyl ethylene acyl diamide, said acyl radical being a straight chain primary saturated radical containing 12 to 18 carbons, polymerizing the dispersed chloro-2-butadiene-1,3 with stirring at about 18° C. to about 20° C. and thereafter adding about 1½% of a polyhydroxy phenol.

13. A stable aqueous positively charged latex of chloro-2-butadiene-1,3 polymer, containing polymer in a concentration in excess of about 25% by weight.

14. A stable aqueous positively charged latex of a halogen-2-butadiene-1,3 polymer, containing polymer in a concentration in excess of about 25% by weight.

15. The process which comprises dispersing chloro-2-butadiene-1,3 in water in the presence of a salt of an organic base selected from the group consisting of simple salts of inorganic acids and organic bases of high molecular weight and complex quaternary ammonium salts which in aqueous solution contain the following nucleus $$\begin{array}{c} R_2 \quad R_1-X \\ \diagdown N \diagup \\ \diagup \diagdown O \\ R_3 \quad R_4 \end{array}$$

in which $R_1$ is an alkylene group and $R_2$, $R_3$ and $R_4$ are alkyl groups, one of which four groups represented by an R contains more than 5 carbon atoms and the other three of which contain less than eight carbon atoms, in which N is separated from X by less than 5 carbon atoms and in which X—O— is an acidic salt forming group, the free valences of the nitrogen and of the oxygen in the nucleus being satisfied in the salts by each other or by the ions of a neutral salt, and thereafter polymerizing the dispersed chloro-2-butadiene-1,3.

16. A dispersion as described in claim 7, further characterized in that X in the general formula is bromine.

17. A dispersion as described in claim 4, further characterized in that the dispersing agent contains a straight chain primary saturated hydrocarbon radical having from 12 to 18 carbon atoms.

18. A dispersion as described in claim 4, further characterized in that the dispersing agent is a complex quaternary ammonium salt.

19. A dispersion as described in claim 4, further characterized in that the dispersing agent contains a straight chain primary saturated hydrocarbon radical having from 12 to 18 carbon atoms, and in that the dispersion contains a stabilizer of the group consisting of polyhydroxy phenols and their ethers.

20. An aqueous dispersion of chloro-2-butadiene-1,3 polymer containing as a dispersing agent cetyl trimethyl ammonium bromide.

21. An aqueous dispersion of chloro-2-butadiene-1,3 polymer containing as a dispersing agent the hydrochloride of diethyl ethylene oleyl diamide.

22. An aqueous dispersion of chloro-2-butadiene-1,3 polymer containing as a dispersing agent C-hexadecyl betaine.

23. A process which comprises dispersing chloro-2-butadiene-1,3 in water in the presence of about 1.5% to about 3% of cetyl trimethyl ammonium bromide, polymerizing the dispersed chloro-2-butadiene-1,3 with stirring at about 18° C. to about 20° C., and thereafter adding about 1.5% of a polyhydroxy phenol.

24. An aqueous dispersion of chloro-2-butadiene-1,3 polymer containing as a dispersing agent a quaternary ammonium salt formed from a tertiary amine and an alkyl halide containing more than 5 carbon atoms.

BENTON DALES.
FREDERICK B. DOWNING.